United States Patent
Hoshida et al.

(10) Patent No.: US 7,603,045 B2
(45) Date of Patent: Oct. 13, 2009

(54) METHOD AND SYSTEM FOR AUTOMATIC FEEDBACK CONTROL FOR FINE TUNING A DELAY INTERFEROMETER

(75) Inventors: Takeshi Hoshida, Tokyo (JP); Seemant Choudhary, Bangalore (IN)

(73) Assignee: Fujitsu Limited, Kawasaki (JP)

( * ) Notice: Subject to any disclaimer, the term of this patent is extended or adjusted under 35 U.S.C. 154(b) by 795 days.

(21) Appl. No.: 10/651,125

(22) Filed: Aug. 28, 2003

(65) Prior Publication Data

US 2005/0047780 A1    Mar. 3, 2005

(51) Int. Cl.
  H04B 10/06  (2006.01)
  H04B 10/12  (2006.01)
  H04B 10/00  (2006.01)

(52) U.S. Cl. .............. 398/209; 398/149; 398/161; 398/162; 398/213

(58) Field of Classification Search .......... 398/33, 398/189–195, 202–214, 149, 150, 161, 102, 398/162

See application file for complete search history.

(56) References Cited

U.S. PATENT DOCUMENTS

| | | | |
|---|---|---|---|
| 4,533,247 A | 8/1985 | Epworth | 356/345 |
| 5,023,947 A | 6/1991 | Cimini, Jr. et al. | 455/619 |
| 5,617,234 A | 4/1997 | Koga et al. | 359/131 |
| 6,111,681 A | 8/2000 | Mizrahi et al. | 359/187 |
| 6,175,320 B1* | 1/2001 | Heflinger | 341/137 |
| 6,188,499 B1 | 2/2001 | Majima | 359/193 |
| 6,271,959 B1* | 8/2001 | Kim et al. | 359/325 |
| 6,396,605 B1 | 5/2002 | Heflinger et al. | 359/154 |
| 6,445,477 B1 | 9/2002 | Madsen et al. | 359/187 |
| 6,469,817 B1 | 10/2002 | Heflinger | 359/189 |
| 6,661,975 B1* | 12/2003 | Hall et al. | 398/180 |
| 7,103,285 B1* | 9/2006 | Okuno | 398/192 |
| 7,187,869 B2* | 3/2007 | Devaux et al. | 398/154 |
| 2002/0044322 A1* | 4/2002 | Blumenthal et al. | 359/161 |
| 2002/0048062 A1* | 4/2002 | Sakamoto et al. | 359/124 |
| 2003/0002112 A1 | 1/2003 | Hirano et al. | 359/161 |
| 2003/0058499 A1 | 3/2003 | Reingand et al. | 359/135 |
| 2003/0058504 A1 | 3/2003 | Cho et al. | 359/161 |
| 2004/0028418 A1* | 2/2004 | Kaplan et al. | 398/188 |

FOREIGN PATENT DOCUMENTS

| | | |
|---|---|---|
| JP | 05-268159 | 10/1993 |
| JP | 06-021891 | * 1/1994 |

(Continued)

OTHER PUBLICATIONS

Agilent, "Measuring Extinction Ratio of Optical Transmitters", Jan. 1, 2001.*

(Continued)

*Primary Examiner*—M. R. Sedighian
(74) *Attorney, Agent, or Firm*—Baker Botts L.L.P.

(57) ABSTRACT

A method for receiving an optical signal is included where an ingress signal is split into a first portion and a second portion. A relative delay is induced between the first portion and the second portion, which are optically interfered to generate at least one interfered signal. Quality criteria of a monitored signal at least based on the at least one interfered signal is monitored so that a relative delay based in the quality criteria may be adjusted.

11 Claims, 3 Drawing Sheets

FOREIGN PATENT DOCUMENTS

JP            11-004196          1/1999

OTHER PUBLICATIONS

Communication from the European Patent Office, European Search Report dated Aug. 4, 2006, for International Application No. 06014162.9-2415, 9 pages.

Communication from the European Patent Office, European Search Report dated Nov. 24, 2005 for International Application No. 04019922.6-2415, 5 pages.

T. Miyano, M. Fukutoku, K. Hattori, and H. Ono, "*Suppression of degradation induced by SPM/XPM+GVD in WDM transmission using a bit-synchronous intensity modulated DPSK signal*", Fifth Optoelectronics and Communications Conference (OECC 2000) Technical Digest, 14D3-3, pp. 580-581, Jul. 2000.

Eric A. Swanson, et al., "*High Sensitivity Optically Preamplified Direct Detection DPSK Receiver with Active Delay-Line Stabilization*," IEEE Photonics Technology Letters, vol. 6, No. 2, 1041-1135/94, pp. 263-265, Feb. 1994.

Communication from The European Patent Office, Communication pursuant to Article 94(3) EPC, for Application No. 06 014 162.9-2415 dated Mar. 12, 2008, 5 pages.

Japanese Office Action and translation received Apr. 9, 2008.

Letter from Davidson, Davidson & Kappel, LLC representing Oyster Optics, Inc. regarding patent and trade secret ltigation with Fujitsu Network Communications, Inc. in the Southern District of New York, case no. 08-CIV-8206 (PKC) with U.S. Patent Application, drawings, and declaration and power of attorney.

Communication from the European Patent Office, Communication pursuant to Article 94(3) EPC, Application No. 06 014 162.9 - 2415, transmitted to Baker Botts Apr. 27, 2009, 4 pages.

Letter from Davidson, Davidson & Kappel, LLC representing Oyster Optics, Inc. regarding patent and trade secret ltigation with Fujitsu Network Communications, Inc. in the Southern District of New York, case no. 08-CIV-8206 (PKC), 1 page.

\* cited by examiner

METHOD AND SYSTEM FOR AUTOMATIC FEEDBACK CONTROL FOR FINE TUNING A DELAY INTERFEROMETER

TECHNICAL FIELD

This disclosure relates generally to the field of optical communication networks and more specifically to a method and system for automatic feedback control for fine tuning a delay interferometer.

BACKGROUND

Telecommunications systems, cable television systems, and data communication networks use optical networks to rapidly convey large amounts of information between remote points. In an optical network, information is conveyed in the form of optical signals through optical fibers. Optical fibers comprise thin strands of glass capable of transmitting the signals over long distances with very little loss. The optical signals have at least one characteristic modulated to encode audio, video, textual, real-time, non-real-time, and/or other suitable data.

For an intensity modulated differential phase shift keying (IMDPSK) system, the transmitter is a phase modulator that transmits a differentially encoded binary data signal by modulating the phase of the carrier signal. The phase modulated signal is further modulated by a bit synchronous sinusoidal clock signal. At the receiver, the encoded signal is differentially decoded and detected.

SUMMARY

A method and system for automatic feedback control for fine tuning a delay interferometer are provided. The automatic feedback control may be used in an optical receiver that monitors quality of a channel and adjusts differential decoding of the channel to enhance channel quality.

According to one embodiment, a method for receiving an optical signal is included where an ingress signal is split into a first portion and a second portion. A relative delay is induced between the first portion and the second portion, which are optically interfered to generate at least one interfered signal. Quality criteria of a monitored signal at least based on the at least one interfered signal is monitored so that a relative delay based in the quality criteria may be adjusted.

Certain embodiments may provide one or more technical advantages. A technical advantage of one embodiment may include improving signal quality at the receiver. More particularly, signal degradation may be reduced or eliminated at the optical receiver by providing for automatic feedback control of a delay interferometer. Another technical advantage of one or more embodiments may include accurate and efficient fine-tuning of a delay interferometer by monitoring quality criteria of optical signals. Yet another advantage of one or more embodiments may include improving DPSK/IMDPSK systems.

Another technical advantage of one or more embodiments includes using quality criteria to automatically adjust the optical signal at the optical delay interferometer. Therefore, an optical communications system may be more cost effective since the optical delay interferometer may not be adjusted manually and drift tolerances associated with transmitter lasers may be lessened. Yet another technical advantage of one or more embodiments may include the use of DPSK/IMDPSK technology with Ultra Long Haul (ULH) systems due to improved tolerance to non-linear effects, optical signal-to-noise ratio (OSNR) and dispersion.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Figure 1:
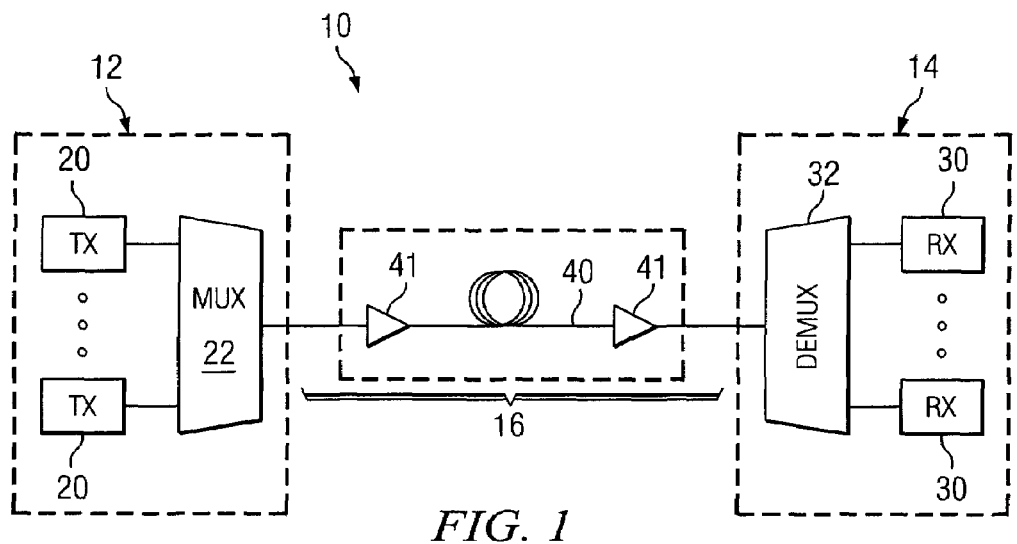
FIG. 1 is a block diagram of one embodiment of an optical communication system.

FIG. 1 is a block diagram of an embodiment of an optical communication system 10 using automatic feedback control for fine tuning a delay interferometer. In general, optical communication system 10 allows optical signals to be transmitted over a common path at disparate wave lengths. An optical receiver receives the optical signals to separate and decode the optical information. In operation, optical communication system 10 is a wavelength division multiplexed (WDM) system such as a dense WDM (DWDM) system, where optical information is transmitted using differential phase shift king (DPSK) with bit synchronous intensity modulation (IM). It is understood that system 10 may comprise other suitable single channel, multi-channel, or by directional transmission systems, and may use other modulation formats. System 10 includes a transmitter 12, an optical link 16, and a receiver 14 coupled as shown in FIG. 1.

Transmitter 12 includes a plurality of optical transmitters 20 and a multiplexer 22. Optical transmitters 20 may form part of a transponder or other node element. Each optical transmitter 20 generates an optical information signal 24 on one of a set of distinct wave lengths $\lambda_1, \lambda_2, \ldots \lambda_n$ at a certain channel spacing. For example, in a particular embodiment, channel spacing may be 100 Gigahertz (GHz). The channel spacing may be selected to avoid or minimize crosstalk between adjacent channels. Optical information signals 24 may comprise optical signals with at least one characteristic modulated to encode audio, video, textual, real time, non-real time, or other suitable data. According to the illustrated embodiment, optical information signals 24 are encoded using differential phase shift keying DPSK with intensity modulation (IM). Optical information signals 24 are multiplexed by multiplexer 22 into a transport signal 26 for transmission on optical link 16. Optical information signals 24 may be otherwise suitably combined into transmit signal 26.

Optical link 16 comprises optical fiber 40 or other suitable medium in which optical signals may be transmitted with low loss. According to one embodiment, optical fiber 40 may comprise Single Mode fiber (SMF). Interposed along optical length 16 are one or more optical amplifiers 41. Optical amplifiers 41 amplify transmit signal 26 without the need for optical to electrical conversion.

Receiver 14 includes a demultiplexer 32 and a plurality of optical receivers 30. Demultiplexer 32 demultiplexes the amplified transmit signal 26 to separate each optical information signal 24 from the others. Each optical receiver 30 receives an optical information signal 24 from the multiplexer 32 and recovers the data information corresponding to each signal 24. As used in this document, "each" refers to each member of a set or each member of a subset of a set.

According to the illustrated embodiment, optical receiver 30 converts phase modulated (PM) signals into amplitude modulated (AM) signals that are further processed by a direct detection receiver. In one embodiment, PM to AM conversion may be performed by a delay interferometer such as Mach-Zehnder interferometer (MZI), a polarization maintaining fiber (PMF) between a pair of suitably aligned polarizers, or any other suitable device operable to delay a portion of a signal relative to another portion and to interfere the delayed portion with another portion of the signal.

In operation, optical transmitter 20 generates an optical information signal 24 at a particular carrier frequency at which a laser device operates. Optical information signal 24 may be multiplexed by multiplexer 22 and amplified by one or more optical amplifiers 41 so that optical information signal 24 may be transmitted through an optical link 16 to receiver 14. At receiver 14, each optical information signal 24 is demultiplexed using demultiplexer 32 and received at the appropriate optical receiver 30, where the signals are decoded to recover the encoded data of optical information signal 24. When a laser frequency drifts at an optical transmitter 20, optical information signal 24 may be received as a deviated signal. Optical receiver 30 monitors one or more quality criteria of optical information signal 24 to automatically determine adjustments to the delay of the signal received to compensate for the deviation in frequency caused at optical transmitter 20.

An embodiment of an optical transmitter for use with the optical communication system 10 of FIG. 1 is described with reference to FIG. 2. An embodiment of a portion of an optical receiver for use with the optical communication system 10 of FIG. 1 is described with reference to FIG. 3. Embodiments of delay interferometers are more particularly described with reference to FIGS. 4A and 4B. Block diagrams of embodiments of feedback control and signal monitoring for use with the optical communication system 10 of FIG. 1 are described with reference to FIGS. 5A-5D. A flowchart of a method for automatic feedback control for fine tuning a delay interferometer is described with reference to FIG. 6.

Figure 2:
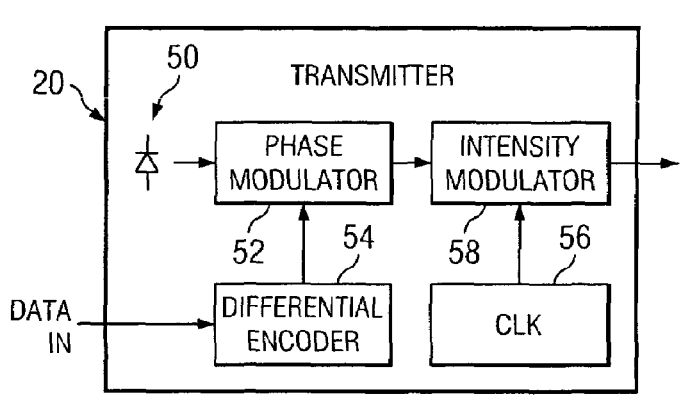
FIG. 2 is a block diagram of one embodiment of an optical transmitter for use with the optical communication system of FIG. 1.

FIG. 2 illustrates an embodiment of an optical transmitter 20 for use with optical communication system 10 of FIG. 1. Optical transmitter 20 may include an optical emitter 50, a phase modulator 52, a differential encoder 54, a clock 56, and an intensity modulator 58 coupled as shown in FIG. 2.

Optical emitter 50 produces an optical carrier that may be modulated to transmit data. Optical emitter 50 may comprise any emitter suitable for generating optical signals at a particular carrier frequency. For example, optical emitter 50 may comprise a laser diode.

Phase modulator 52 and differential encoder 54 modulate encoded data using the optical carrier. Differential encoder 54 receives a stream of bits that are encoded using DPSK techniques. Phase modulator 52 receives the differentially encoded bits to modulate the phase of the optical carrier to produce an optically modulated signal comprising differentially encoded bits. According to the illustrated embodiment, phase modulator 52 generates a DPSK signal having binary data encoded as either a zero or $\pi$ phase swing between adjacent bits. In one embodiment, phase modulator 52 may be driven to reduce the depth of phase modulation by adjusting the driving voltage. For example, a driving voltage of phase modulator 52 may be reduced to decrease the phase modulation from zero to $\pi$ to a phase swing of zero to $2\alpha$, where the resulting phase modulation may be in the range of $0<2\alpha<\pi$. Any other suitable phase swing and/or phase shift difference may be used without departing from the cope of the invention.

Clock 56 provides a synchronization signal that intensity modulator 58 utilizes to modulate the received DPSK signal using bit synchronous intensity modulation. Transmitter 20 may include additional or fewer modules depending on the desired application. For example, transmitter 20 may include a driver amplifier coupled to phase modulator 52 to drive the phase modulation of an electronic subcarrier received from emitter 50.

Figure 3:
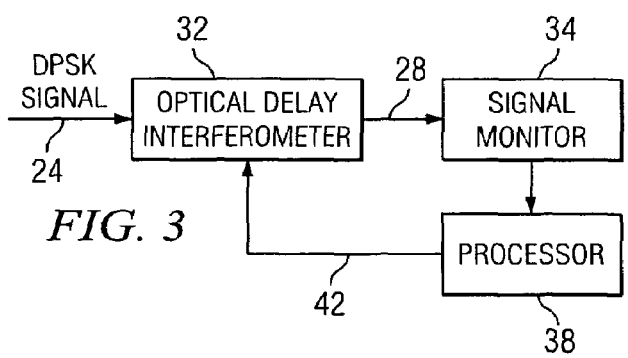
FIG. 3 is a block diagram of one embodiment of an optical receiver for use with the optical communication system of FIG. 1.

FIG. 3 is the block diagram of an embodiment illustrating a portion of an optical receiver for use with optical communication system 10 of FIG. 1. According to the illustrated embodiment, optical receiver 30 includes an optical delay interferometer 32, a signal monitor 34, and a processor 38 coupled as shown in FIG. 3. A photodiode or other detector (not shown) may be coupled to the output of the optical delay interferometer, between the optical delay interferometer 32 and the signal monitor 34 or otherwise in receiver 30. Thus, signal monitor 34 may monitor the interfered signal, a decoded signal, a recovered signal, or other signal that is at least based on the interfered signal.

Optical delay interferometer 32 receives ingress optical information signal 24 and demodulates it to generate an interfered signal 28. According to one embodiment, optical delay interferometer 32 is an optical device operable to split a received signal into two portions. Additionally, optical delay interferometer 32 induces a relative delay, or shift, between the portions of the split signal. Optical delay interferometer 32 optically interferes the portions of the split signals into at least one interfered signal 28. According to one embodiment, optical delay interferometer 32 comprises a Mach-Zehnder interferometer (MZI). Any other optical device suitable for converting phase modulated (PM) signals into interfered signal 28 may be used without departing from the scope of the invention. For example, optical delay interferometer 32 may comprise a polarization maintaining fiber (PMF), or a birefringer fiber.

Before being monitored by signal monitor 34, interfered signal 28 may be detected by a photodetector to generate a detected signal. By photodetecting interfered signal 28 before monitoring, signal monitor 34 may receive a photocurrent and a photovoltage associated with optical information signal 24. Additionally, as will be described in more detail below, signal monitor 34 and optical delay interferometer 32 may be DC biased to allow a DC current corresponding to the detected signal to be monitored by signal monitor 34.

Signal monitor 34 monitors quality criteria corresponding to a detected signal. According to one embodiment, the quality criteria may comprise a Bit Error Rate (BER), extinction ratio, and an optical power. Any other suitable criteria indicative of the quality of a detected or other signal may be used. Signal monitor 34 may comprise an RF monitor, a DC monitor, a trans-impedance amplifier, a controller, a forward error correction unit (FEC), or any other device suitable for monitoring a signal. Embodiments of signal monitor 34 will be described in more detail with respect to FIGS. 5A-5D.

Processor 38 receives monitored quality criteria information to adjust the relative delay of optical delay interferometer 32. The information may be, for example, the value of a quality criteria, an indication of any change, a value of any change, an indication that a level or limit has been exceeded or the like. For example, processor 38 may receive a measurement of optical power, which processor 38 may use to generate a feedback signal 42. Using feedback signal 42, processor 38 may control and adjust the relative delay induced by optical delay interferometer 32. In one embodiment, processor 38 uses feedback signal 42 to adjust the temperature of optical delay interferometer 32 in order to adjust the relative delay of the split signal portions that combine to form interfered signal 28. In another embodiment, the relative delay may be adjusted mechanically such as with a free-space optics system. Processor 38 may comprise any suitable logic, whether hardware and/or software, operable to control the relative delay at optical delay interferometer 32 based on information from signal monitor 34.

Modifications, additions, or omissions may be made to the optical receiver portion without departing from the scope of the invention. For example, a Bias-T module may be coupled to optical delay interferometer 32 and signal monitor 34 to perform DC biasing. Additionally, functions may be performed using any suitable logic compressing software, hardware, other logic, or any suitable combination of the proceeding.

Figure 4A:
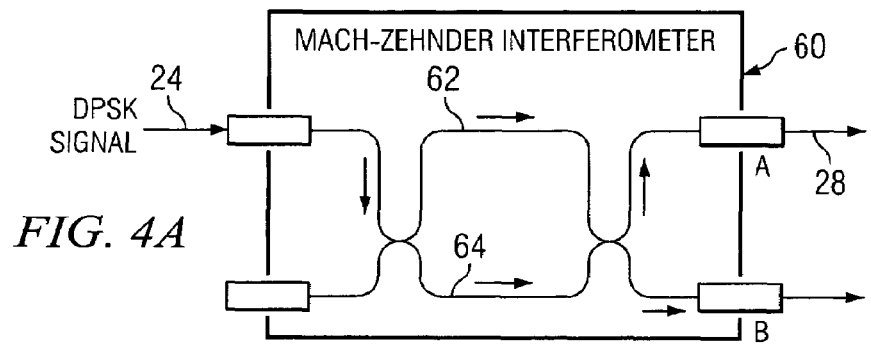
FIGS. 4A and 4B illustrate embodiments of optical delay interferometers for use in the optical receiver of FIG. 3.
Figure 4B:
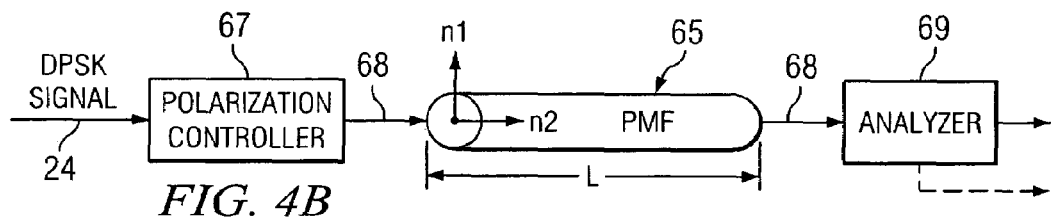

FIGS. 4A and 4B illustrate embodiments of optical delay interferometer 32 for use in optical communications system 10 of FIG. 1. FIG. 4A illustrates one embodiment of a Mach-Zehnder interferometer (MZI) 60. According to the illustrated embodiment, MZI 60 includes an upper arm 62 and a lower arm 64. MZI 60 converts a phase modulated (PM) signal into an amplitude modulated (AM) signal by optically delaying one portion of the signal with respect to the other and applying additional phase shift between the two arms of the MZI. The amount of relative delay equals approximately the symbol period, or can be equal to any integer multiple of the symbol period. The relative phase shift between the upper arm and the lower arm may vary from $\pi/2$ to $-\pi/2$.

The upper arm signal 62 and lower arm signal 64 are interferometrically combined. For example, MZI 60 achieves constructive interference if the phase of the upper arm signal 62 or lower arm signal 64 are in phase. MZI 60 achieves destructive interference if the phase difference between upper arm 62 and lower arm 64 is $\pi/2$. Typically, the IMDPSK signal, or optical information signal 24, received at MZI 60, is split into two arms with a splitting ratio of 0.5. Additionally, upper arm signal 62 and lower arm signal 64 may be combined using a 3 dB coupling. According to one embodiment, the relative phase shift and relative delay may be adjusted by controlling the temperature of a waveguide associated with MZI 60. According to one embodiment, MZI 60 may be implemented using planar lightwave circuit (PLC) technology. The PLC may be implemented on a silica substrate, and the relative phase shift between the two arms may be controlled by changing the substrate temperature.

According to the illustrated embodiment, MZI 60 may include egress optical port A and egress optical port B, which may be complimentary to each other. For example, if upper arm signal 62 and lower arm signal 64 have a phase difference of 180 degrees, MZI 60 achieves destructive interference of the current received bit and the previous received bit resulting in optical port A generating a low level signal.

The above-stated example may be more particularly represented by describing a transmitted IMDPSK signal s(t) by Equation (1):

$$s(t)=A\sin(2\pi rt)\cos(2\pi ft+\phi(t)) \quad (1)$$

where r is the bit rate, f is the carrier frequency for the bit rate r, $\phi(t)$ is the data encoded as a phase of the carrier signal, using 180 degrees for bit 1 and zero degrees for bit 0. From Equation (1) a signal at optical port A of MZI 60 may be described by Equation (2):

$$A(t)=(A/2)\sin(2\pi rt)[\cos(2\pi ft+\phi(t)+\pi+\cos(2\pi ft+\phi(t-T)+\Theta-2\pi fT)] \quad (2)$$

where T=1/r and defines the bit period, $\Theta$ represents the phase difference between upper arm 62 and lower arm 64, and $2\pi fT$ represents a relative phase difference introduced due to the relative delay of one bit period.

From Equation (2) the relative phase difference $2\pi fT$ introduced due to bit delay depends on the carrier frequency f for a given bit rate r. If the frequency drifts from f to $f+\Delta$, the relative phase difference in the delay interferometer would be changed as described by Equation (3):

$$\Delta\Theta=2\pi(f+\Delta f)T-2\pi(f)T=2\pi fT \quad (3)$$

Since the frequency of the transmitter carrier drifts slowly with time, the relative phase difference $\Delta\Theta$ may be cancelled by adjusting the phase change $\Theta$. This can be achieved, for example, by tuning the temperature of the PLC substrate. If the geometrical path lengths of the upper and lower arms are $L_U$ and $L_L$, respectively, and the temperature coefficient of the effective refractive index of the waveguides is k (/degree), the required temperature change $\Delta T$ to provide the phase change $\Theta$ may be described by Equation (4):

$$\Theta=(L_U-L_L)k\Delta T/c \quad (4)$$

where c is the speed of light in a vacuum.

By monitoring quality criteria of the signals in at least one of the output ports of MZI 60, the frequency drift may be tracked so that an adjustment to the relative phase difference or delay of upper arm 62 and lower arm 64 may be adjusted. Feedback control and monitoring signal quality criteria will be described with reference to FIG. 5.

FIG. 4B illustrates an embodiment of a polarization maintaining fiber (PMF) 65 for use as optical delay interferometer 32. A polarization controller 67 may be used to receive IMDPSK signals and control the polarization of the IMDPSK signal to a 45 degree linear polarization. PMF 65 carries polarized signal 68 over a fiber of length L and birefringence of (n1-n2). Similarly to the embodiment of MZI 60, PMF 65 introduces a relative delay between two signals. This relative delay may be described by Equation (5):

$$L(n1-n2)/c \quad (5)$$

where L is the length of PMF 65, (n1-n2) represents the birefringence of PMF 65.

PMF 65 carries polarized light, where the orthogonal polarization components may be interfered and received by analyzer 69. Analyzer 69 receives polarized signal 68 and monitors the quality criteria of the interfered signal. According to another embodiment, analyzer 69 may comprise a polarization beam splitter (PBS) to split polarized signal 68 into two linearly polarized signals orthogonal to each other that may be used when monitoring signals from more than one port of optical delay interferometer 32.

Figure 5A:
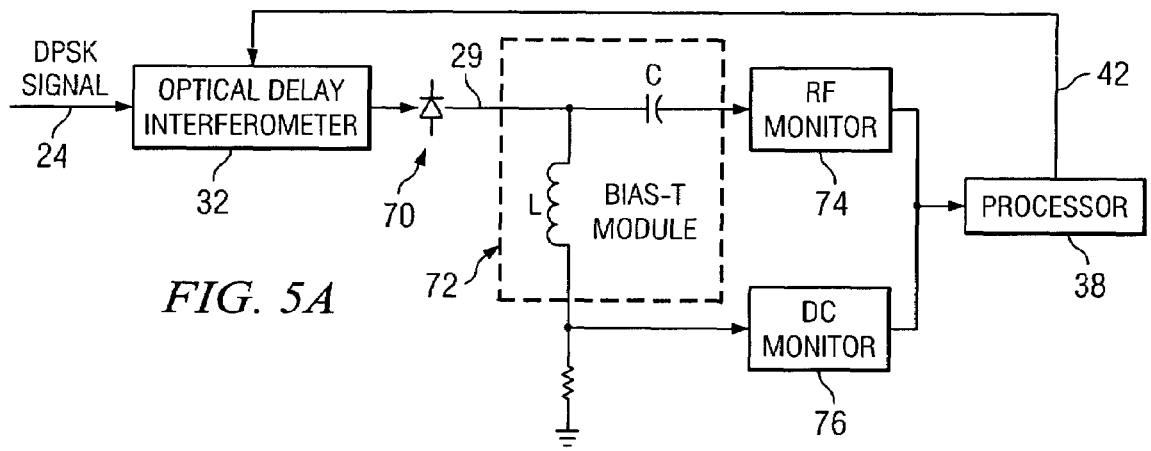
FIGS. 5A-5D illustrate embodiments of feedback control and signal monitoring for use in the optical receiver of FIG. 3.
Figure 5B:
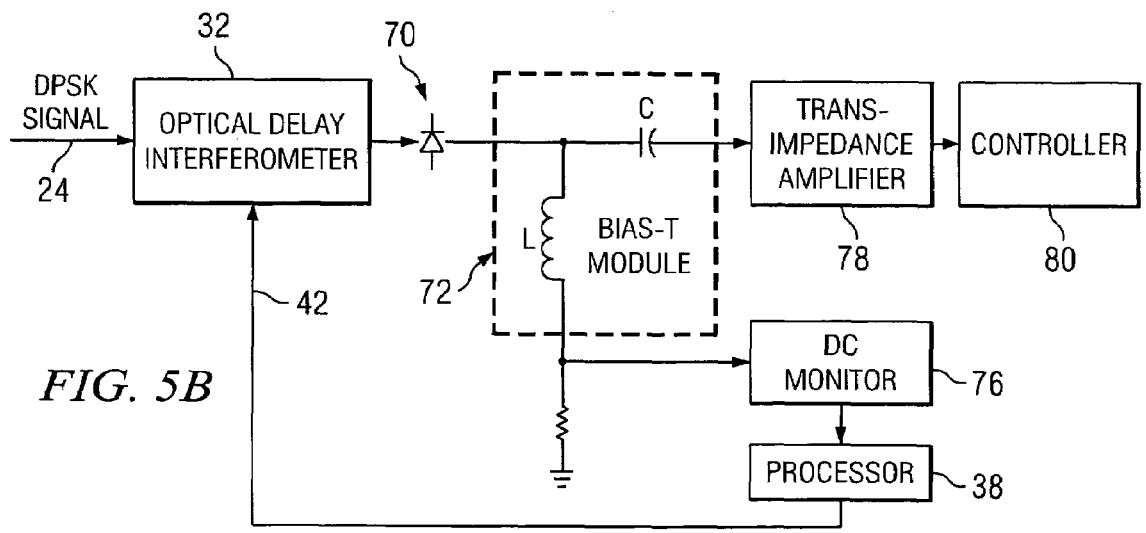
Figure 5C:
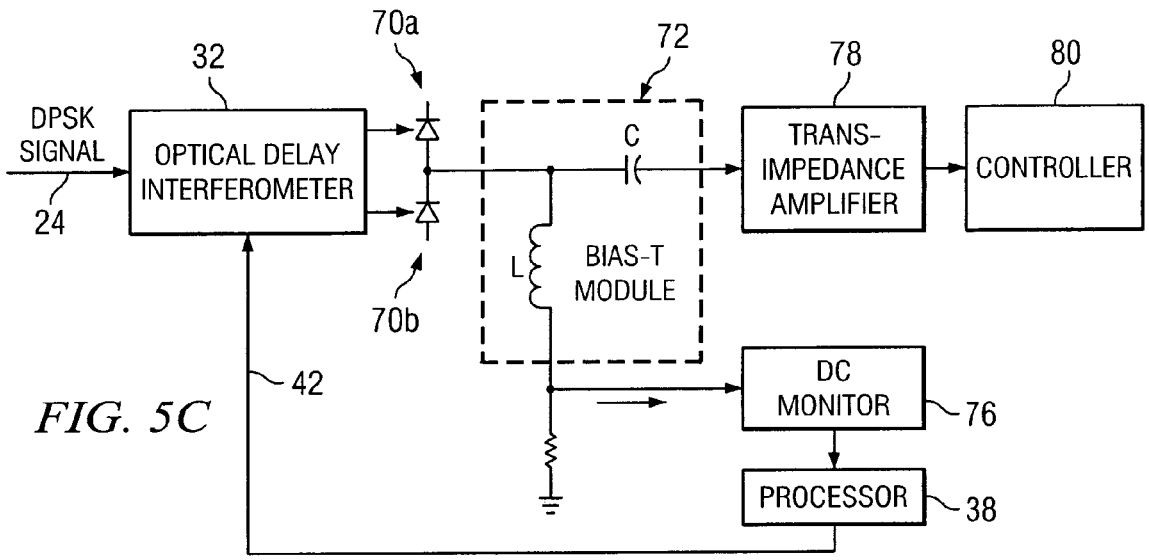
Figure 5D:
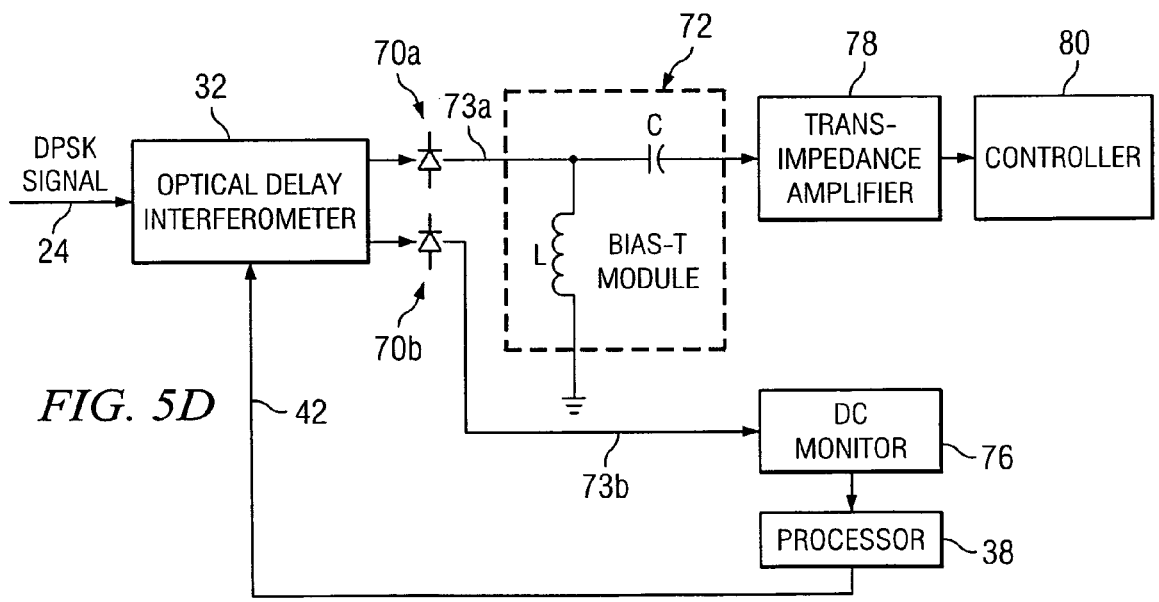

FIGS. 5A through 5D illustrate embodiments of feedback control and signal monitoring that may be used with the optical communication system 10 of FIG. 1. For example, FIG. 5A illustrates one embodiment of automatic feedback control using monitoring of extinction ratio, while FIGS. 5B through 5D illustrate embodiments of feedback control using optical power monitoring. Other suitable circuits may be used without departing from the scope of the present invention.

FIG. 5A is a block diagram of an embodiment illustrating an automatic feedback control using monitoring of extinction ratio. As used in this document, the extinction ratio of an amplitude modulated (AM) signal may be defined as the ratio of the power levels corresponding to level 1 and level 0. According to one embodiment, when the relative phase difference between the two arms of the optical delay interferometer 32 is optimum, the extinction ratio is maximum.

Photodetector 70 receives interfered signal 28 from optical delay interferometer 32 and generates a detected signal 29. Detected signal 29 is split by a Bias-T module 72, which is operable to split a high frequency component from a low frequency component of the signal. The high frequency component, or RF signal, may be received by RF monitor 74 and the low frequency component, or DC component, may be received by DC monitor 76. RF monitor 74 can detect reductions in RF power of detected signal 29 and therefore reductions in RF power of optical information signal 24. RF monitor 74 provides the RF power measurements to processor 38 where the RF power measurements are normalized using a DC power measurement obtained by DC monitor 76. By normalizing the measured RF power, fluctuations caused by changing input optical power may be eliminated.

Processor 38 may determine from a decrease in RF power and normalized power, that an extinction ratio decreases. Accordingly, processor 38 may adjust the relative delay of optical delay interferometer 32 in order to improve the extinction ratio. In one embodiment, the relative delay may be increased by increasing the extinction ratio.

FIG. 5B is a block diagram illustrating an automatic feedback control using optical power monitoring. In operation, the optical power of an output of optical delay interferometer 32 may be used to adjust or optimize the phase difference or the relative delay of optical delay interferometer 32. In order to enable this function, the phase modulation depth may be reduced at the transmitter by decreasing the driving voltage of phase modulator 52 as was described with reference to FIG. 2. Although reducing the driving voltage may also lead to an eye opening penalty, reducing the phase modulation depth may increase the degree of control corresponding to monitoring optical power to adjust the relative phase difference at the optical delay interferometer 32. In one embodiment, an eye opening penalty may be less than 0.2 dB for a reduction in driving voltage at the transmitter resulting in a reduction of phase modulation depth of $2\alpha > 150$ degrees. Any other suitable reduction in driving voltage may be selected to monitor the optical power without departing from the scope of the present invention.

Optical power is monitored based on a DC current received by DC monitor 76 after a Bias-T module 72 splits detected signal 29. The RF component of detected signal 29 may be received by trans-impedance amplifier 78 for conversion and amplification of the signal into an electrical signal that may be used by controller 80 to receive the data. DC monitor 76 measures an average optical power corresponding to the detected signal 29 from a single port at optical delay interferometer 32. Processor 38 receives the measured average optical power and generates a feedback signal 42 to adjust the relative delay and to maximize the detected signal 29. The controlling algorithm to determine the feedback signal 42 so that the detected signal 29 be maximized may be found in the public domain.

FIG. 5C is a block diagram illustrating another embodiment of an automatic feedback control using optical power monitoring. In this embodiment, both optical port outputs of optical delay interferometer 32 are detected by photodetectors 70a and 70b so that a balanced photodetected signal may be monitored. As was described in reference to FIGS. 5A and 5B, a Bias-T module 72 may be used to split a signal into an RF component and DC component. The DC current associated with balanced photodetected signal is received by DC monitor 76 to measure the optical power. According to the illustrated embodiment, DC monitor 76 measures the DC voltage which may be proportional to the average optical power difference of the signals detected by each photodetector 70a and 70b. Based on the average power difference, processor 38 may determine feedback signal 42. As was discussed with reference to FIG. 5B, the average power difference between the two output ports as measured by DC monitor 76 is used by processor 38 to determine if the relative delay at optical delay interferometer 32 may be adjusted. For example, maintaining an average optical power difference at or near a maximum may be accomplished by processor 38 adjusting the relative phase difference to as close as possible to 180 degrees.

FIG. 5D is a block diagram illustrating yet another embodiment of an automatic feedback control using optical power monitoring of two optical ports of optical delay interferometer 32. Similarly to the embodiment described with reference to FIG. 5C, the optical port signals of optical delay interferometer 32 are each detected by photodetectors 70a and 70b. In this embodiment, detected signals 73a and 73b are each used for a different purpose. For example, detected signal 73a is used for signal reception by directing its RF signal component trans-impedance amplifier 78 and controller 80. In contrast, detected signal 73b may be dedicated to measuring optical power by DC monitor 76. As was described with reference to FIG. 5C, DC monitor 76 measures the optical power of detected signal 73b and compares it to an average optical power so that processor 38 may determine feedback signal 42 that adjusts the relative delay at optical delay interferometer 32.

Modifications, additions, or omissions may be made to the embodiments shown with reference to FIGS. 5A through 5D without departing from the scope of the invention. For example, although a Bias-T module 72 is shown to include a capacitor C and an inductor L, any other, or additional components suitable for splitting a signal into an RF signal and DC current may be used without departing from the scope of the invention. As another example, with reference to FIG. 5A, DC monitor 76 may be modified to include a forward error correction (FEC) unit to monitor a bit error rate corresponding to the detected signal 29 that may be used by processor 38 to adjust the relative delay at optical delay interferometer 32. Additionally, functions may be performed using any suitable logic comprising software, hardware, other logic, or any suitable combination of the preceding.

Figure 6:
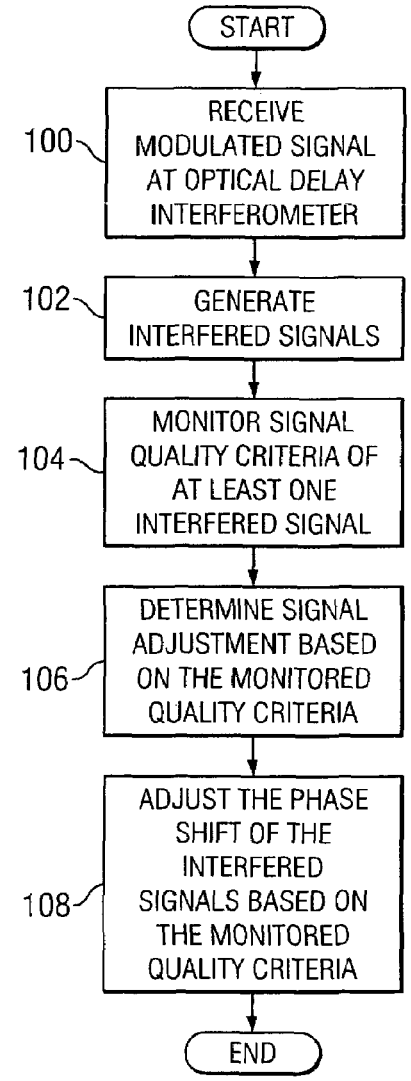
FIG. 6 is a flowchart illustrating one embodiment of a method for automatic feedback control for fine tuning a delay interferometer.

FIG. 6 is a flowchart of a method for automatic feedback control for fine tuning a delay interferometer. It will be understood that the method may be used in connection with any number of optical receivers 30 and any number of optical information signals 24.

The method begins at step 100 where optical delay interferometer 32 receives a modulated signal. According to the illustrated embodiment, the modulated signal comprises an intensity modulated DPSK signal (IMDPSK). The method proceeds to step 102, where optical delay interferometer 32 generates one or more interfered signals. As was described with reference to FIGS. 4A and 4B, optical delay interferometer 32 may split a signal into a plurality of signals, delay one of the signals relative to the other, and interfere the plurality of signals. For example, according to the embodiment described with reference to FIG. 4A, MZI 60 splits the signal into an upper arm signal 62 and a lower arm signal 64 and introduces a relative delay at upper arm signal 62 with reference to lower arm signal 62.

The method proceeds to step 104, where signal monitor 34 monitors signal quality criteria of at least one interfered signal. According to one embodiment, signal monitor 34 monitors a detected signal using a bit error rate (BER), an extinction ratio, and an optical power. At step 106, processor 38 determines the signal adjustment based on the monitored quality criteria. For example, if signal monitor 38 monitors the BER of a detected signal, processor 38 determines feedback signal 42 comprising forward error correction information based on the monitored BER.

The method then proceeds to step 108, where processor 38 adjusts the phase shift of the interfered signals based on the monitored quality criteria. For example, processor 38 may use a feedback signal 42 comprising forward error correction information to adjust the relative delay between the upper arm 62 and lower arm 64 of optical delay interferometer 32. After adjusting the phase shift at step 108, the method terminates. The method may be repeated continuously, or periodically, for example, once a second, a few times a minute, once per bit period T, or otherwise.

Steps may be added, omitted, modified, or performed in any suitable order without departing from the scope of the invention. For example, a step of detecting at a photodetector an optical signal may be added between the steps of generating interferometer paths at step 102 and monitoring signal properties at step 104. As another example, a step may be added after generating interferometer paths according to a phase shift at step 102, where the interferometer paths are optically interfered to yield an interfered signal.

Certain embodiments may provide one or more technical advantages. A technical advantage of one embodiment may include improving signal quality at the receiver. More particularly, signal degradation may be reduced or eliminated at the optical receiver by providing for automatic feedback control of a delay interferometer. Another technical advantage of one or more embodiments may include accurate and efficient fine-tuning of a delay interferometer by monitoring quality criteria of optical signals. Yet another advantage of one or more embodiments may include improving DPSK/IMDPSK systems.

Another technical advantage of one or more embodiments includes using quality criteria to automatically adjust the optical signal at the optical delay interferometer. Therefore, an optical communications system may be more cost effective since the optical delay interferometer may not be adjusted manually and drift tolerances associated with transmitter lasers may be lessened. Yet another technical advantage of one or more embodiments may include the use of DPSK/IMDPSK technology with Ultra Long Haul (ULH) systems due to improved tolerance to non-linear effects, optical signal-to-noise ratio (OSNR) and dispersion.

Although an embodiment of the disclosure and its advantages are described in detail, a person skilled in the art could make various alterations, additions, and omissions without departing from the spirit and scope of the invention as defined by the appended claims.

What is claimed is:

1. A method for receiving an optical signal, comprising:
reducing a phase modulation depth for modulation of a signal at an optical transmitter, the signal encoded with information;
receiving the signal as an ingress signal at an optical receiver;
splitting, by the optical receiver, the ingress signal into a first portion and second portion;
inducing, by the optical receiver, a relative delay between the first portion and the second portion;
optically interfering, by the optical receiver, the first and second portions to generate at least one interfered signal;
monitoring, by the optical receiver, an optical power of a monitored signal at least based on the at least one interfered signal by:
measuring a Direct Current (DC) voltage of the at least one interfered signal; and
comparing the measured DC voltage with an average power corresponding to the at least one interfered signal, the comparison yielding a difference between the measured DC voltage and the average power;
adjusting, by the optical receiver, the relative delay based on the difference; and
decoding, by the optical receiver, the information encoded in the signal.

2. A method for receiving an optical signal, comprising:
reducing a phase modulation depth for modulation of a signal at an optical transmitter, the signal encoded with information;
receiving the signal as an ingress signal at an optical receiver;
splitting, by the optical receiver, the ingress signal into a first portion and a second portion;
inducing, by the optical receiver, a relative delay between the first portion and the second portion;
optically interfering, by the optical receiver, the first and the second portions to generate at least two interfered signals;
monitoring, by the optical receiver, an optical power of a monitored signal at least based on the at least two interfered signals by:
measuring a Direct Current (DC) voltage of the at least two interfered signals; and
determining a difference between each of the DC voltages of the at least two interfered signals;
adjusting, by the optical receiver, the relative delay based on the difference; and
decoding, by the optical receiver, the information encoded in the signal.

3. The method of claim 2, wherein the relative delay is induced by a delay interferometer comprising a member selected from the group consisting of a Mach-Zehnder Interferometer, and a polarization maintaining fiber (PMF).

4. The method of claim 2, wherein the ingress signal is a signal encoded using differential phase shift keying (DPSK) with bit synchronous intensity modulation (IM).

5. The method of claim 2, wherein adjusting the relative delay further comprises controlling a temperature of a delay interferometer.

6. A system for receiving an optical signal, comprising:
an optical transmitter operable to:
encode a signal with information; and
reduce a phase modulation depth for modulation of the signal; and an optical receiver comprising:

a delay interferometer operable to:
  split the signal received as an ingress signal into a first portion and second portion;
  induce a relative delay between the first portion and the second portion;
  optically interfere the first and second portions to generate at least one interfered signal;
a signal monitor operable to monitor an optical power of a monitored signal at least based on the at least one interfered signal by measuring a Direct Current (DC) voltage of the at least one interfered signal; and
a processor operable to adjust the relative delay based on the optical power by:
  comparing the measured DC voltage with an average power corresponding to the at least one interfered signal, the comparison yielding a difference between the measured DC voltage and the average power; and
  adjusting the relative delay based on the difference; and the optical receiver operable to decode the information encoded in the signal.

7. A system for receiving an optical signal, comprising:
an optical transmitter operable to:
  encode a signal with information; and
  reduce a phase modulation depth for modulation of the signal; and
an optical receiver comprising:
  a delay interferometer operable to:
    split the signal received as an ingress signal into a first portion and second portion;
    induce a relative delay between the first portion and the second portion;
    optically interfere the first and second portions to generate at least one interfered signal;
  a signal monitor operable to monitor an optical power of a monitored signal at least based on the at least one interfered signal by measuring a Direct Current (DC) voltage of a first interfered signal and a second interfered signal;
  a processor operable to adjust the relative delay based on the optical power by:
    determining a difference between each of the DC voltages of the first and second interfered signals; and
    adjusting the relative delay based on the difference; and
the optical receiver operable to decode the information encoded in the signal.

8. The system of claim 7, wherein the delay interferometer comprises a member selected from the group consisting of a Mach-Zehnder Interferometer, and a polarization maintaining fiber (PMF).

9. The system of claim 7 wherein the ingress signal is a signal encoded using differential phase shift keying (DPSK) with bit synchronous intensity modulation (IM).

10. The system of claim 7, wherein the processor is further operable to adjust the relative delay by controlling a temperature of the delay interferometer.

11. A method for receiving an optical signal, comprising:
reducing a phase modulation depth for modulation of a signal at an optical transmitter, the signal encoded with information;
receiving the signal as an ingress signal at an optical receiver;
splitting, by the optical receiver, an ingress signal into a first portion and second portion, the ingress signal being a signal encoded using differential phase shift keying (DPSK) with bit synchronous intensity modulation (IM);
inducing, by the optical receiver, a relative delay between the first portion and the second portion, the relative delay introduced by a delay interferometer comprising a member selected from the group consisting of a Mach-Zehnder Interferometer, and a polarization maintaining fiber (PMF);
optically interfering, by the optical receiver, the first and second portions to generate at least one interfered signal;
monitoring an optical power of a monitored signal at least based on the at least one interfered signal;
measuring a Direct Current (DC) voltage of the at least one interfered signal;
comparing the measured DC voltage with an average power corresponding to the at least one interfered signal, the comparison yielding a difference between the measured DC voltage and the average power;
adjusting, by the optical receiver, the relative delay based on the difference by controlling a temperature of the delay interferometer; and
decoding, by the optical receiver, the information encoded in the signal.

* * * * *

UNITED STATES PATENT AND TRADEMARK OFFICE
CERTIFICATE OF CORRECTION

PATENT NO. : 7,603,045 B2 Page 1 of 1
APPLICATION NO. : 10/651125
DATED : October 13, 2009
INVENTOR(S) : Takeshi Hoshida et al.

It is certified that error appears in the above-identified patent and that said Letters Patent is hereby corrected as shown below:

Column 6, Line 11, before "+cos($2\pi f_i t$+" insert -- ) --.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,603,045 B2
APPLICATION NO. : 10/651125
DATED : October 13, 2009
INVENTOR(S) : Hoshida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1463 days.

Signed and Sealed this

Fifth Day of October, 2010

David J. Kappos
*Director of the United States Patent and Trademark Office*